United States Patent [19]
Offterdinger

[11] 3,919,747
[45] Nov. 18, 1975

[54] SADDLE CLAMPS AND A METHOD OF MAKING SUCH CLAMPS

[75] Inventor: Hermann Friedrich Offterdinger, Burlington, Canada

[73] Assignee: The Schultz Manufacturing Company Limited, Burlington, Canada

[22] Filed: Jan. 28, 1975

[21] Appl. No.: 544,735

[52] U.S. Cl. .................................. 24/277; 285/199
[51] Int. Cl.² ..................... B65D 63/00; F16L 41/00
[58] Field of Search ....................... 285/199; 24/277

[56] References Cited
UNITED STATES PATENTS

| | | | |
|---|---|---|---|
| 852,682 | 5/1907 | Schuermann | 285/199 |
| 2,431,950 | 12/1947 | Mauerer | 24/277 X |
| 2,795,439 | 6/1957 | Smith | 285/199 X |
| 2,985,934 | 5/1961 | Daubner | 24/277 |
| 3,409,259 | 11/1968 | Cross | 24/277 UX |
| 3,735,950 | 5/1973 | Paintin | 24/277 UX |

*Primary Examiner*—Donald A. Griffin
*Attorney, Agent, or Firm*—Hirons & Rogers

[57] ABSTRACT

A new saddle clamp comprises a U-bolt and a saddle strap providing complementary semicircular bights that meet in a diametric plane and embrace a cylindrical member to be clamped over the full 360° of its circumference. The nuts employed with the U-bolt engage downwardly-inwardly inclined surfaces on the saddle strap to move the bolt legs together for uniform clamping sealing pressure around the cylindrical member as they are tightened thereon. It is found essential that the planes in which these nut-receiving surfaces lie do not intersect the cross-section of the cylindrical members being clamped since, if they do, rigid cylindrical members can act as reaction members to spread the legs apart and prevent the desired uniform sealing circumferential pressure.

5 Claims, 6 Drawing Figures

SADDLE CLAMPS AND A METHOD OF MAKING SUCH CLAMPS

FIELD OF THE INVENTION

The invention is concerned with improvements in or relating to the type of clamp known in the art as saddle clamps, and commonly used to clamp together two telescoped tubular members, such as an automobile muffler and its associated pipes. The invention is also concerned with a method of making such clamps.

REVIEW OF THE PRIOR ART

Various proposals have been made hitherto for saddle clamp constructions. One of the chief commercial uses of saddle clamps is to clamp together two telescoping members so that there is a leakproof connection between them, and to this end W. L. Daubner proposed in U.S. Pat. Ser. No.: 2,985,934, issued 30th May, 1961, a saddle clamp construction intended to create substantially uniform compressive force over the entire 360° of the tubular structure on which it is mounted. His clamp consists of a U-shaped bolt cooperating with a saddle strap formed from a substantially rectangular flat metal blank, and the manner in which his clamp is intended to function to achieve his object will be described below in the description of the preferred embodiments of this invention. I have discovered that Daubner is in error in believing that his construction will achieve such 360° uniform compressive sealing force under all conditions, as will be explained in detail below, but in actual practice it can only achieve this objective if employed with very easily deformable tubular members, such as rubber tubes, and not with more rigid members, such as the steel tubes used in automobile exhaust systems.

DEFINITION OF THE INVENTION

It is an object of the invention therefore to provide a new form of saddle clamp in which effective sealing pressure over the full 360° of circumference can actually be achieved, especially with tubular metal members.

In accordance with the present invention there is provided a new saddle clamp comprising a saddle strap and a cooperating U-bolt each having a semicircular bight portion embracing a respective semicircular part of the cylindrical member periphery, which parts meet one another at a diametric plane, the U-bolt having two substantially parallel tangential leg portions each at one end of its bight portion and externally screw-threaded at their ends for the reception of respective clamping nuts, the saddle strap having two apertures for the passage of the bolt legs therethrough and nut-bearing surfaces surrounding said apertures, the said surfaces being disposed in respective planes which are sufficiently spaced from the diametric plane not to intersect the cross-section of the cylindrical member and are symmetrically downwardly-inwardly inclined with respect to the diametric plane.

DESCRIPTION OF THE DRAWINGS

An example of a prior art saddle clamp and a clamp which is a preferred embodiment of the present invention will now be described, by way of example, with reference to the accompanying diagrammatic drawing, wherein.

DESCRIPTION OF THE PREFERRED EMBODIMENT

The same number will be used for similar parts of the prior art clamp and my new clamp.

Figure 1:
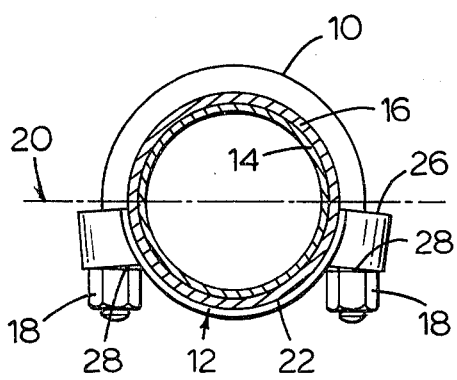
FIG. 1 is an end elevation of the prior art construction showing it in position to clamp together two telescoped metal tubes.

Referring now to FIG. 1 the prior art clamp illustrated therein consists of a U-bolt 10 and cooperating saddle strap 12 shown as clamping together two telescoped tubes 14 and 16. The U-bolt is of conventional form with a substantially semi-circular bight portion and substantially parallel leg portions, the leg portions being externally threaded at their ends to receive nuts 18. The junctions between the semicircular bight portion and the respective leg portions lie in a plane 20, which is diametrical to the bight portion and to the two tubes 14 and 16, and will herinafter be referred to as the diametrical plane for the clamp.

The saddle strap 12 consists of a semicircular bight portion 22 with U-shaped bolt-receiving receptacles 24 at each end, the upper edges 26 of these receptacles being arranged to lie in a plane below the diametrical plane 20 when the clamp is in assembled position, but not clamped up tight, on the tubes 14 and 16. It will be seen that the lower edges 28 of these receptacles are inclined slightly inwardly upwardly toward the diametrical plane and, because of this inclination, the nuts tend to move inwardly as they are tightened and draw the bolt legs inwardly toward one another to cause the bolt to be wrapped tightly about the underlying tubular assembly. With the nuts tightly home the edges 26 lie in the diametrical plane 20 and the compressive force thus exerted was believed by Daubner to be exerted radially inward throughout the entire circumference of the tubular assembly.

I have discovered that Daubner is in error in believing that his saddle clamp construction will achieve such uniform 360° compressive force under all conditions, and in fact it can only achieve this objective if employed with easily deformable tubular members, such as rubber tubes. This is inherent in the geometry of the device and is believed to be due principally to the fact that the inclined faces 28 which are relied upon to produce the desired inward clamping force are disposed in a plane that intersects the cross-section of the tubular members to be clamped. The tubular members constitute a solid reaction member against which the action of tightening the nuts 18 is to force the legs of the U-shaped bolt apart and not draw them together, and typically with this type of clamp, when used in an application such as the clamping together of the relatively rigid tubes of an automobile muffler system, leakage is found to occur just above the diametrical plane 20 (as seen in FIG. 1) where the legs have been forced away from the tube 16.

Figure 2:
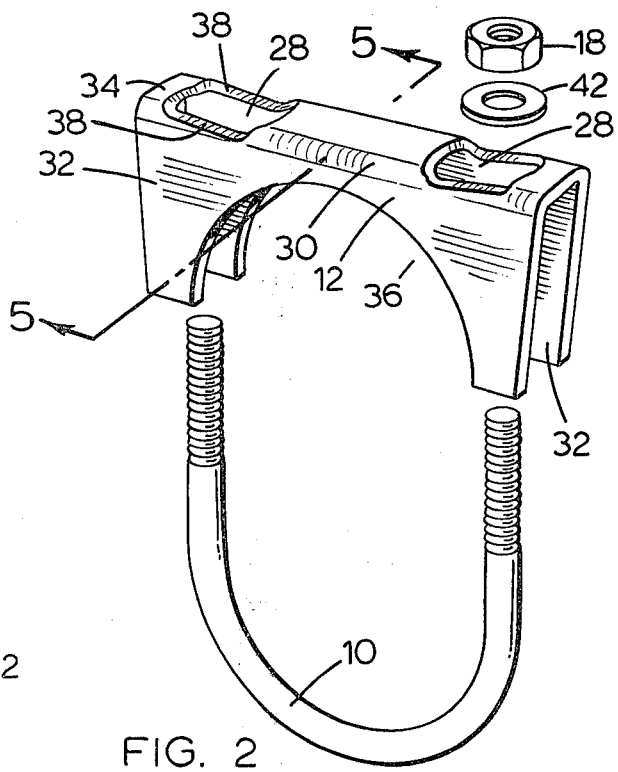
FIG. 2 is an exploded perspective view of a clamp of the present invention.
Figure 6:
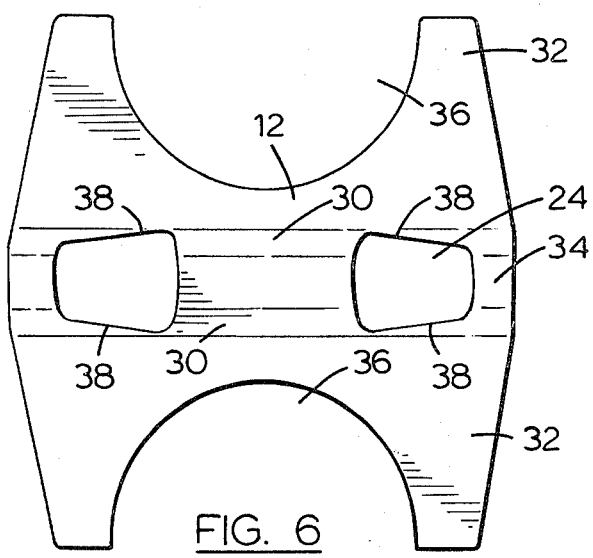
FIG. 6 is a plan view of a blank from which the saddle strap of the invention is formed.
Figure 5:
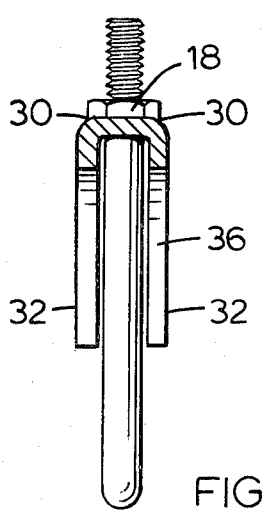
FIG. 5 is a section taken on the line 5—5 of FIG. 2.
Figure 4:
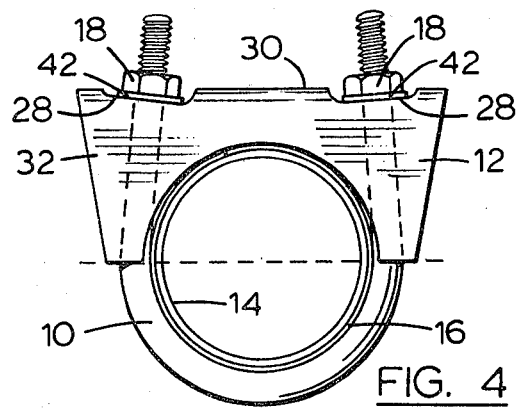
FIG. 4 is a view similar to FIG. 3, but with the clamp fully tightened.

Reference is now made to FIGS. 2 to 6, showing my new clamp and illustrating a preferred method of its manufacture. Thus, the clamp consists of a U-bolt 10 in which the parallel leg portions are substantially longer than the above-described prior art clamp. The saddle strap 12 preferably is formed by folding a blank as illustrated in FIG. 6 about two spaced parallel fold areas 30 until the two side portions 32 thereof are parallel and it is of U-shaped configuration in the direction longitudinally of the cylindrical members being clamped, as illustrated by FIGS. 2 and 5. The strap thereby has two side walls 32 and a connecting end wall 34.

It will be seen from FIG. 6 that each of the side walls 32 of the blank is provided with a semicircular recess 36 which are aligned with one another when the side walls are parallel, the edges of these recesses closely embracing the cylindrical member 16 to provide a saddle strap bight complementing the bight of the U-bolt 10, so that the member 16 is closely embraced over the full 360 degrees of its circumference, the junction between the two said bights being in the diametrical plane 20.

The blank is also provided at the end wall 34 with two holes 24 which are outwardly tapered toward each other. Thus, the two edges 38 of each hole lying within the fold areas 30 are spaced apart at their outermost ends a distance just slightly greater than the distance between the two fold areas, while at their innermost ends the spacing extends to the outermost edges of the areas 30. With holes of this shape the folding of the walls 32 parallel to one another, closely adjacent to the bolt legs as shown in FIG. 5, automatically results in the formation of symmetrical downwardly-inwardly inclined surfaces 28 including the junction areas and surrounding the apertures 24.

Figure 3:
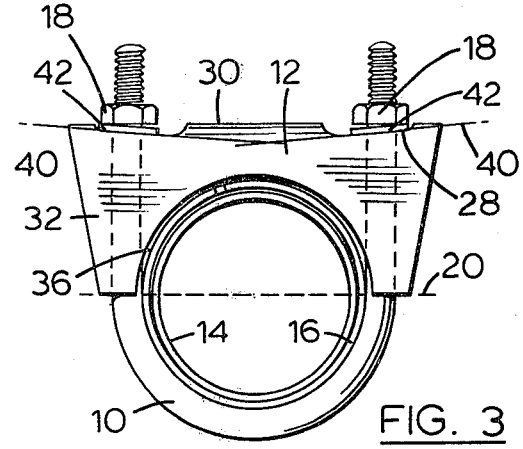
FIG. 3 shows the clamp of FIG. 2 in position on a pair of telescoped metal tubes before full tightening of the clamp thereon.

The planes in which the surfaces 28 lie are indicated in FIG. 3 by the references 40 and it will be seen that they are both sufficiently spaced from the diametric plane 20 that they cannot intersect the cross-section of the outermost cylindrical member. I find that provided this condition of the nut-bearing surface planes 40 is fulfilled then, upon tightening of the nuts 18 or the U-bolt, the nuts tend to move the U-bolt legs toward each other by sliding down the surfaces, but there is no possibility of the tubular members providing reaction around their periphery that will act to spread the bolt legs or the saddle strap legs apart and prevent uniform application of sealing pressure over the full 360 degrees of circumference. As is usual washers 42 are interposed between the nuts 18 and the surfaces 28, but the latter are conveniently designated in the specification and claims as nut-bearing surfaces.

A preferred form of the saddle strap has been specifically described which is readily formed using a progressive die from flat sheet material, but other ways of forming the strap, e.g. by casting, within the scope of the appended claims will be apparent to those skilled in the art.

I claim:
1. A saddle clamp for clamping about the periphery of a cylindrical member comprising a saddle strap and a cooperating U-bolt each having a semicircular bight portion embracing a respective semicircular part of the cylindrical member periphery, which parts meet one another at a diametric plane, the U-bolt having two substantially parallel tangential leg portions each at one end of its bight portion and externally screw-threaded at their ends for the reception of respective clamping nuts, the saddle strap having two apertures for the passage of the bolt legs therethrough and nut-bearing surfaces surrounding said apertures, the said surfaces being disposed in respective planes which are sufficiently spaced from the diametric plane not to intersect the cross-section of the cylindrical member and are symmetrically downwardly inwardly inclined with respect to the diametric plane.

2. A saddle clamp as claimed in claim 1, wherein the saddle strap is of U cross-section longitudinally of the cylindrical member comprising two spaced substantially parallel bight-providing side walls having respective semicircular recesses the edges of which embrace the cylindrical member, and a connecting wall having the said leg-receiving apertures therein.

3. A saddle clamp as claimed in claim 1, wherein the saddle strap is of U cross-section longitudinally of the cylindrical member comprising two spaced apart substantially parallel bight-providing side walls and a connecting wall having the said leg-receiving apertures therein, the side walls being closely adjacent to the bolt legs which pass therebetween and having respective semicircular recesses therein the edges of which embrace the cylindrical members, the junctions of the side walls and the end wall providing part of the said nut-bearing surfaces.

4. A saddle clamp as claimed in claim 2, wherein the saddle strap is formed by folding a flat blank about two spaced parallel fold lines constituting the junctions between the side walls and the end walls.

5. A saddle clamp as claimed in claim 4, wherein the leg-receiving apertures in the end walls are tapered outwardly toward each other so that the hole peripheries provide the said downwardly-inwardly inclined nut-receiving surfaces.

* * * * *